US012552094B2

(12) United States Patent
Soares Latour et al.

(10) Patent No.: US 12,552,094 B2
(45) Date of Patent: Feb. 17, 2026

(54) POLYAMIDE POWDERS AND USE THEREOF IN POWDER AGGLOMERATION PROCESSES BY SINTERING

(71) Applicant: Arkema France, Colombes (FR)

(72) Inventors: Emilie-Marie Soares Latour, Serquigny (FR); Ornella Zovi, Serquigny (FR); Arnaud Lemaitre, Serquigny (FR); Hervé Ster, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 340 days.

(21) Appl. No.: 17/767,954

(22) PCT Filed: Oct. 12, 2020

(86) PCT No.: PCT/FR2020/051795
§ 371 (c)(1),
(2) Date: Apr. 11, 2022

(87) PCT Pub. No.: WO2021/069851
PCT Pub. Date: Apr. 15, 2021

(65) Prior Publication Data
US 2024/0092014 A1    Mar. 21, 2024

(30) Foreign Application Priority Data
Oct. 11, 2019  (FR) ...................... 1911298

(51) Int. Cl.
*B29C 64/153* (2017.01)
*B29K 77/00* (2006.01)
*B29K 105/00* (2006.01)
*C08G 69/08* (2006.01)
*C08G 69/26* (2006.01)

(52) U.S. Cl.
CPC ............ *B29C 64/153* (2017.08); *C08G 69/08* (2013.01); *C08G 69/26* (2013.01); *B29K 2077/00* (2013.01); *B29K 2105/251* (2013.01)

(58) Field of Classification Search
CPC .............. B29C 64/153; B29K 2077/00; B29K 2105/251; B33Y 50/00; B33Y 70/00; C08G 69/08; C08G 69/26; C08J 3/12; C08K 5/09; C08K 5/092; C08K 5/17
See application file for complete search history.

(56) References Cited

U.S. PATENT DOCUMENTS

| 8,173,258 B2 | 5/2012 | Monsheimer |
| 2004/0102539 A1 | 5/2004 | Monsheimer et al. |
| 2004/0106691 A1 | 6/2004 | Monsheimer et al. |
| 2006/0071359 A1 | 4/2006 | Monsheimer |
| 2009/0291308 A1 | 11/2009 | Pfister et al. |
| 2017/0253702 A1 | 9/2017 | Ma et al. |

FOREIGN PATENT DOCUMENTS

| CN | 1497016 A | 5/2004 | |
| CN | 1817942 A | 8/2006 | |
| CN | 102449068 A | 5/2012 | |
| CN | 102639611 A | 8/2012 | |
| CN | 104910616 A | 9/2015 | |
| CN | 105238041 A * | 1/2016 | |
| EP | 2530121 A1 | 12/2012 | |
| WO | 2017000923 A1 | 1/2017 | |
| WO | WO-2020074840 A1 * | 4/2020 | ........... B29C 64/153 |

OTHER PUBLICATIONS

CN-105238041-A machine translation (Jan. 13, 2016).*
WO-2020074840-A1 machine translation (Apr. 16, 2020).*
Chinese Official Action in corresponding Chinese application No. 202080071214.1, mailed on Oct. 17, 2023, 16 Pages (English-translation only).
International Search Report (PCT/ISA/210) with translation and Written Opinion (PCT/ISA/237) mailed on Dec. 10, 2020, by the European Patent Office as the International Searching Authority for International Application No. PCT/FR2020/051795.
Fu D et al. "Low temperature nylon powder material used for selective laser sintering includes dodecanedioic acid, deuterated trifluoroacetic acid, antioxidant, solvent, nucleating agent, plasticizer and silane coupling agent" WPI/ 2017 Clarivate Analytics, vol. 2016, No. 7, Jun. 14, 2019, XP002792099.
Farkai et al., "Synthetic Fibers," Textile Industry Press, Dec. 31, 1987, pp. 310-311, 4 pages.
Fourth Office Action (English translation only) issued the the China National Intellectual Property Administration, on Jul. 3, 2025 in related Chinese Application No. 202080071214.1, 11 pages.
Office Action (English translation only) issued the the Korean Intellectual Property Office (KIPO, on Oct. 13, 2025 in related Korean Application No. 10-2022-7015813, 7 pages.
Office Action (with English translation) issued the the European Patent Office (EPO), on Dec. 5, 2025 in related European Application No. 20797829.7, 14 pages.

\* cited by examiner

*Primary Examiner* — Ana L. Woodward
(74) *Attorney, Agent, or Firm* — Boone IP Law

(57) ABSTRACT

A polyamide powder for use in a process of powder agglomeration by sintering, including at least one chain limiting agent. A process for preparing a powder including at least one chain limiting agent, wherein the chain limiter is mixed with the polyamide powder, and if need be at least one thioether antioxidant, by dry blending.

19 Claims, No Drawings

POLYAMIDE POWDERS AND USE THEREOF IN POWDER AGGLOMERATION PROCESSES BY SINTERING

FIELD OF THE INVENTION

The present invention relates to powders of polymers, in particular of polyamides, intended to be used in processes for agglomeration of powders by melting and which can be recycled several times.

TECHNICAL BACKGROUND

Polyamide powder agglomeration technology is used to manufacture three-dimensional objects by addition or agglomeration of powder by melting layer by layer. This technology is used in particular to manufacture prototypes and models, in various fields such as the motor vehicle, nautical, aeronautical, aerospace, medical, textile, clothing and decorative fields, the field of housings for electronics, telephony, home automation, computing and lighting, fashion, sport and industrial tools. The agglomeration of powders by melting (or "sintering") is brought about by radiation, such as for example a laser beam (also known as laser sintering), infrared radiation, UV radiation, LED-type radiation or any source of electromagnetic radiation which makes it possible to melt the powder layer by layer in order to manufacture three-dimensional objects.

In the case of laser sintering, a thin layer of polyamide powder is deposited on a horizontal plate maintained in a chamber heated to a temperature lying between the crystallization temperature Tc and the melting temperature Tm of the polyamide powder. The laser makes it possible to fuse powder particles at various points in the layer which crystallize slowly after the passage of the laser according to a geometry corresponding to the object, for example using a computer that stores the shape of the 3D object and that reproduces this shape in the form of 2D slices. Subsequently, the horizontal plate is lowered by a value corresponding to the thickness of a powder layer (for example between 0.05 and 2 mm and generally of the order of 0.1 mm), and then a new powder layer is deposited and the laser makes it possible to fuse the powder particles according to a geometry corresponding to this new layer which crystallizes slowly according to a geometry corresponding to the object and so on. The procedure is repeated until the entire object has been manufactured. An object surrounded by powder is obtained inside the chamber. The parts which have not been agglomerated have thus remained in the powder state.

In the case of laser sintering, at least 50% of the powder is not targeted by the laser. It is thus advantageous to be able to reuse, i.e. to recycle, this powder during the next build (or next "run"). For this, the polyamide powder should have conserved its initial properties as much as possible: particle size, pourability, color, viscosity, etc.

During a sintering build, the surrounding powder, i.e. the powder not touched by the radiation, remains for several hours above its crystallization temperature (Tc), which may lead to an increase in the molecular weight and thus in the viscosity of the polyamide. Thereafter, coalescence between powder grains becomes increasingly difficult in the course of the successive runs. Thus, certain polyamide powders require the parameters of the sintering device to be modified, in particular the power of the radiation to be drastically increased, on each recycling of the powder during successive runs. In addition, a very marked decline in the mechanical properties of the parts obtained as the runs progress is observed.

In order to limit the increase in molecular weight of the polyamide powders, metal soaps (0.5%) were added to the polyamide powder (US2004106691). However, when they are in contact with certain solvents, the objects manufactured from these powders have a tendency to leach out metal salt derivatives, which restricts their use to certain applications.

In addition, high-temperature steam treatments of the powder used during a run were carried out before recycling the treated powder to a subsequent run (US20090291308). However, this process necessitates, between 2 successive runs, and close to the sintering device, treating the powder with steam and drying it, which requires numerous intermediate steps between the runs and is not economically viable.

It is therefore necessary to provide powders that are easy to use and can be recycled several times without it being necessary to modify the conditions of use of the sintering device and that thus make it possible to obtain objects with reproducible mechanical properties.

SUMMARY OF THE INVENTION

The present invention stems from the unexpected demonstration, by the inventors, that the addition of at least one chain limiter in the solid or liquid state, in particular a monoacid, a dicarboxylic acid, a monoamine or a diamine, to a polyamide powder makes it possible to control, in particular to lower, stabilize or eliminate, the increase in the viscosity and the melting temperature of the non-agglomerated polyamide powder which occurs during the successive cycles, or runs, of a process for agglomeration by melting. This makes it possible to reuse or recycle the non-agglomerated powder and to obtain objects with reproducible properties in the course of successive runs.

Thus, the present invention relates to a polyamide powder intended to be used in a process for agglomeration of powder by melting, comprising at least one chain limiter.

The present invention also relates to the use of polyamide powder as defined above, to manufacture objects by agglomeration of said powder by melting.

The present invention also relates to a process for manufacturing an object in which a polyamide powder as defined above is agglomerated by melting.

The present invention also relates to an object manufactured using at least one polyamide powder as defined above.

The present invention also relates to a process as defined above in which the non-agglomerated polyamide powder is recovered.

The present invention also relates to the use of a non-agglomerated polyamide powder recovered according to the above process for the manufacture of objects by agglomeration of the powder by melting.

The present invention also relates to the use of at least one chain limiter to control the increase in viscosity or melting temperature of a polyamide powder intended to be used in a process for manufacturing an object by agglomeration of powder by melting.

The present invention also relates to the use of at least one chain limiter to improve the recyclability of a polyamide powder intended to be used in a process for agglomeration of powder by melting.

DETAILED DESCRIPTION OF THE INVENTION

Definitions

In the present description, the D50 of a powder, also referred to as "volume median diameter", corresponds to the value of the particle size which divides the population of particles examined exactly in two. The D50 is measured according to the standard ISO 9276—parts 1 to 6: "Representation of results of particle size analysis" or according to the standard ISO 13319.

The inherent viscosity in solution (in particular of the polyamide powder or of the objects obtained by a process for agglomeration of powder by melting) is preferably measured according to the method comprising the following steps:
- taking samples of between 0.07 and 0.10 grams and preferably of 0.15 grams maximum,
- adding m-cresol solvent by weighing in order to obtain a concentration of 0.5% by weight relative to the total weight of the solution,
- dissolving on a hot plate stirrer, regulated at 100° C.±5° C., until the sample has completely dissolved;
- cooling the solution to room temperature, preferably for at least 30 minutes;
- measuring the flow time T0 of the pure solvent and the flow time T of the solution using a micro-Ubbelohde tube viscometer in a thermostatically-controlled bath regulated at 20° C.±0.05° C.,
- calculating the viscosity according to the formula 1/C×Ln (T/T0), where C represents the concentration and Ln the natural logarithm,
- for each sample, an average of 3 measurements from 3 different solutions is taken.

The melting temperature according to the invention is preferably measured by differential scanning calorimetry (DSC) according to the ISO 11357-6 standard, in particular on a DSC Q2000 device (TA Instruments), preferably with an equilibrium at −20° C. (temperature change rate 20° C./min up to 240° C., 20° C./min down to −20° C., 20° C./min up to 240° C.).

For the purposes of the present invention, the term "reproducible mechanical properties" means mechanical properties, notably tensile modulus, elongation at break and tensile strength, which each remain at least greater than 90% of their value measured for an object of the same form constructed by 3D printing from fresh powder.

Unless otherwise mentioned, the percentages expressed are percentages by weight. Unless otherwise mentioned, the parameters to which reference is made are measured at atmospheric pressure and at room temperature (approximately 23° C.). The standard NF EN ISO 1874-1:2011 defines a nomenclature for polyamides. The term "monomer" in the present description of polyamide-based powders should be taken in the sense of a "repeating unit". A special case is where a repeating unit of the polyamide consists of the combination of a diacid with a diamine. It is the combination of a diamine and a diacid, that is to say the "diamine-diacid" or "XY" pair, in equimolar amounts that is considered to correspond to the monomer. This is explained by the fact that, individually, the diacid or the diamine is only a structural unit, which is not sufficient by itself alone to form a polymer.

Chain Limiter

Preferably, the chain limiter according to the invention is selected from the group consisting of dicarboxylic acids, monocarboxylic acids, diamines and monoamines, each of which may be linear or cyclic.

Preferably, the chain limiter has a melting temperature below 180° C.

The chain-limiting monocarboxylic acid according to the invention preferably has from 2 to 20 carbon atoms. As examples of chain-limiting monocarboxylic acid, mention may be made of acetic acid, propionic acid, benzoic acid and stearic acid, lauric acid, butanoic acid, pentanoic acid, hexanoic acid, heptanoic acid, octanoic acid, nonanoic acid, decanoic acid, undecanoic acid, acrylic acid, methacrylic acid, crotonic acid, cinnamic acid, hexadecanoic acid, octodecanoic acid and tetradecanoic acid.

The chain-limiting dicarboxylic acid according to the invention preferably has from 2 to 20 carbon atoms, more preferably from 6 to 10 carbon atoms. As examples of chain-limiting dicarboxylic acid according to the invention, mention may be made of sebacic acid, adipic acid, azelaic acid, suberic acid, dodecanedicarboxylic acid, butanedioic acid and ortho-phthalic acid.

Preferably, the chain-limiting monoamine according to the invention is a primary amine having from 2 to 18 carbon atoms. As examples of chain-limiting monoamine according to the invention, mention may be made of 1-aminopentane, 1-aminohexane, 1-aminoheptane, 1-aminooctane, 1-aminononane, 1-aminodecane, 1-aminoundecane, 1-aminododecane, benzylamine and oleylamine.

Preferably, the chain-limiting diamine according to the invention has from 4 to 20 carbon atoms. As examples of chain-limiting diamine according to the invention, mention may be made of the isomers of bis(4-aminocyclohexyl) methane (BACM), bis(3-methyl-4-aminocyclohexyl)methane (BMACM) and 2,2-bis(3-methyl-4-aminocyclohexyl) propane (BMACP), and para-aminodicyclohexylmethane (PACM), isophoronediamine (IPDA), 2,6-bis(aminomethyl) norbornane (BAMN) and piperazine. Preferably, the chain limiter according to the invention represents from 0.01% to 10%, preferably from 0.01% to 5%, preferably from 0.01% to 4%, preferably from 0.01% to 3%, preferably from 0.01% to 2%, preferably from 0.01% to 1% by weight relative to the total weight of polyamide powder representing 100%. More preferably, the chain limiter according to the invention represents from 0.01% to 0.5%, from 0.01% to 0.4%, from 0.01% to 0.3%, from 0.01% to 0.2% by weight relative to the total weight of polyamide powder representing 100%.

The chain limiter is preferably in powder form.

The chain limiter according to the invention is preferably added to the medium comprising the polyamide already formed and is not incorporated in the composition of the polyamide.

Preferably, the chain limiter is incorporated into the polyamide powder by any suitable method known to those skilled in the art, such as for example dry blending, liquid mixing, aqueous dispersion, mixing by compounding, diffusion mixing.

According to one embodiment, the chain limiter, preferably in powder form, is dry blended with a polyamide powder.

Surprisingly, the reaction between the chain limiters and the end of the polyamide chain which occurs during the 3D printing process effectively limits the increase in the inherent viscosity of the powder and does not disrupt the conditions of the 3D printing.

The invention thus proposes a powder comprising a chain limiter which is very easy to use.

According to one embodiment, the chain limiter, preferably in powder form, is mixed with a powder of polyamide prepolymers having an inherent viscosity of less than or equal to 0.80. The mixture then undergoes a solid-state polycondensation step in order to obtain a polyamide powder having the desired viscosity.

The solid-state polycondensation step is carried out at a temperature above the glass transition temperature and below the melting temperature of the polyamide. The solid-state polycondensation is typically carried out in a dryer.

This embodiment makes it possible to provide a powder that is ready to use in a 3D printing process, which has several advantages:
- it does not require milling for which complex conditions are often required for a polyamide powder with a high inherent viscosity,
- it avoids the use of a solvent during the preparation.

In the case where the prepolymer is subjected to one or more intermediate steps before the polycondensation step, for example a water treatment step and/or an acid treatment step, the chain limiter is preferably added after the above-mentioned intermediate steps.

Thus, the chain limiters added have either reacted with the chain ends of the polyamide prepolymers during the polycondensation step or will react with the functions available to react on the polyamide chain during the 3D printing.

Thus, the loss of chain limiter materials used is avoided. In particular, when chain limiters are added during the polymerization in the presence of monomers, some of the limiter molecules will be incorporated into the polyamide chain, thus losing their ability to limit the elongation of the polyamide chain.

According to one embodiment, the chain limiter is mixed with the polyamide prepolymer powder that has previously undergone a water treatment step and/or an acid treatment step.

For this embodiment, the chain limiter preferably has a melting temperature above the glass transition temperature and below the melting temperature of the polyamide.

Advantageously, the chain limiter according to the invention makes it possible to control, in particular to lower, stabilize or eliminate, the increase in viscosity and/or melting temperature of a polyamide powder used in a process for agglomeration by melting but that is not agglomerated, which makes it possible to reuse the powder in the powder agglomeration process. Thus, particularly advantageously, the chain limiter according to the invention makes it possible to recycle or reuse the non-agglomerated polyamide powder and to obtain objects having reproducible properties in the course of successive runs (cycles).

Polyamide

The polyamide according to the invention may be a homopolyamide, a copolyamide or a mixture thereof. The polyamide according to the invention may also be a blend of polyamide and of at least one other polymer, the polyamide forming the matrix and the other polymer(s) forming the dispersed phase.

Preferably, the polyamide according to the invention is a condensation product:
- of one or more amino acids;
- of one or more lactams; or
- of one or more salts or mixtures of diamines with diacids.

As examples of an amino acid, mention may be made of $\alpha,\omega$-amino acids, such as aminocaproic, 7-aminoheptanoic, 11-aminoundecanoic, n-heptyl-11-aminoundecanoic and 12-aminododecanoic acids.

The lactam monomers according to the invention comprise, preferably, between 3 and 12 carbon atoms on the main ring and may be substituted. As examples of a lactam according to the invention, mention may be made of $\beta,\beta$-dimethylpropiolactam, $\alpha,\alpha$-dimethylpropiolactam, amylolactam, caprolactam, capryllactam, enantholactam, 2-pyrrolidone and lauryllactam.

Preferably, the diamine included in the composition of the polyamide according to the invention is an aliphatic diamine, an aryl diamine and/or a saturated cyclic diamine having from 6 to 12 carbon atoms. As examples of a diamine according to the invention, mention may be made of hexamethylenediamine, decanediamine, piperazine, tetramethylenediamine, octamethylenediamine, decamethylenediamine, dodecamethylenediamine, 1,5-diaminohexane, 2,2,4-trimethyl-1,6-diaminohexane, polyol diamines, isophoronediamine (IPD), methylpentamethylenediamine (MPDM), bis(aminocyclohexyl)methane (BACM), bis(3-methyl-4-aminocyclohexyl)methane (BMACM), meta-xylylenediamine, bis(p-aminocyclohexyl)methane and trimethylhexamethylenediamine.

Preferably, the dicarboxylic acid included in the composition of the polyamide according to the invention has between 4 and 18 carbon atoms. As examples of a dicarboxylic acid, mention may be made of adipic acid, sebacic acid, azelaic acid, suberic acid, isophthalic acid, butanedioic acid, 1,4-cyclohexanedicarboxylic acid, terephthalic acid, the sodium or lithium salt of sulfoisophthalic acid, dimerized fatty acids (these dimerized fatty acids have a dimer content of at least 98% and are preferably hydrogenated) and dodecanedioic acid $HOOC—(CH_2)_{10}—COOH$.

Preferably, the copolyamide according to the invention results from the condensation of at least two different monomers, for example of at least two different $\alpha,\omega$-aminocarboxylic acids or of two different lactams or of a lactam and of an $\alpha,\omega$-aminocarboxylic acid with different carbon numbers. Mention may also be made of copolyamides resulting from the condensation of at least one $\alpha,\omega$-aminocarboxylic acid (or one lactam), at least one diamine and at least one dicarboxylic acid. Mention may also be made of copolyamides resulting from the condensation of an aliphatic diamine with an aliphatic dicarboxylic acid and at least one other monomer chosen from aliphatic diamines other than the preceding one and aliphatic diacids other than the preceding one.

Preferably, the polyamide powder according to the invention comprises at least one polyamide or copolyamide comprising at least one monomer selected from the group consisting of 46, 4T, 54, 59, 510, 512, 513, 514, 516, 518, 536, 6, 64, 69, 610, 612, 613, 614, 616, 618, 636, 6T, 9, 104, 109, 1010, 1011, 1012, 1013, 1014, 1016, 1018, 1036, 10T, 11, 12, 124, 129, 1210, 1212, 1213, 1214, 1216, 1218, 1236, 12T, MXD6, MXD10, MXD12, MXD14, and mixtures thereof.

Preferably, the polyamide according to the invention is selected from the group consisting of PA 6, PA 66, PA 1010, PA 11, PA 12, PA 1011, PA 610, PA 612, PA 613, and mixtures thereof.

As examples of copolyamides, mention may be made of copolymers of caprolactam and of lauryllactam (PA 6/12), copolymers of caprolactam, of adipic acid and of hexamethylenediamine (PA 6/66), copolymers of caprolactam, of lauryllactam, of adipic acid and of hexamethylenediamine (PA 6/12/66), copolymers of caprolactam, of lauryllactam, of 11-aminoundecanoic acid, of azelaic acid and of hexamethylenediamine (PA 6/69/11/12), copolymers of caprolactam, of lauryllactam, of 11-aminoundecanoic acid, of adipic acid and of hexamethylenediamine (PA 6/66/11/12), copolymers of lauryllactam, of azelaic acid and of hexamethylenediamine (PA 69/12), copolymers of 11-aminoundecanoic acid, of terephthalic acid and of decamethylenediamine (PA 11/10T).

As regards the blend of polyamide and of at least one other polymer, it is in the form of a blend with a polyamide matrix and the other polymer(s) form the dispersed phase. As examples of this other polymer according to the invention, mention may be made of polyolefins, polyesters, polycarbonate, PPO (abbreviation of polyphenylene oxide), PPS (abbreviation of polyphenylene sulfide), and elastomers such as ether-amide block copolymers (PEBA), thermoplastic polyurethane (TPU), elastomeric polyphenylene ether (PPE).

It is also possible to use blends of polyamides. These are, for example, blends of aliphatic polyamides and of semiaromatic polyamides and blends of aliphatic polyamides and of cycloaliphatic polyamides.

By way of example, mention may be made of compositions based on a semicrystalline polyamide (A), an amorphous polyamide (B), a flexible polyamide (C) and a compatibilizer (D), comprising by weight, the total being 100%:
  5% to 40% of an amorphous polyamide (B) which results essentially from the condensation:
    either of at least one diamine chosen from cycloaliphatic diamines and aliphatic diamines and of at least one diacid selected from cycloaliphatic diacids and aliphatic diacids, at least one of these diamine or diacid units being cycloaliphatic,
    or of a cycloaliphatic α,ω-aminocarboxylic acid,
    or of a combination of these two possibilities,
    and optionally of at least one monomer chosen from α,ω-aminocarboxylic acids or the optional corresponding lactams, aliphatic diacids and aliphatic diamines,
  0 to 40% of a flexible polyamide (C) chosen from copolymers containing polyamide blocks and polyether blocks and copolyamides,
  0 to 20% of a compatibilizer (D) for a semicrystalline polyamide (A) and (B),
  0 to 40% of a flexible modifier (M),
  with the condition that (C)+(D)+(M) is between 0 and 50%,
  the balance to 100% of a semicrystalline polyamide (A).

Mention may also be made of compositions based on a semicrystalline polyamide (A), optionally an amorphous polyamide (B), a flexible polyamide (C) and a compatibilizer (D), comprising by weight, the total being 100%:
  optionally 5% to 40% of an amorphous polyamide (B) which results essentially from the condensation of at least one optionally cycloaliphatic diamine, of at least one aromatic diacid and optionally of at least one monomer chosen from: α,ω-aminocarboxylic acids, aliphatic diacids, aliphatic diamines,
  0 to 40% of a flexible polyamide (C) chosen from copolymers containing polyamide blocks and polyether blocks and copolyamides,
  0 to 20% of a compatibilizer (D) for a semicrystalline polyamide (A) and optionally (B),
  (C)+(D) is between 2% and 50%,
  with the condition that (B)+(C)+(D) is not less than 30%,
  the balance to 100% of a semicrystalline polyamide (A).

It would not constitute a departure from the scope of the invention to replace a portion of the polyamide with a copolymer containing polyamide blocks and polyether blocks, i.e. to use a mixture comprising at least one of the preceding polyamides and at least one copolymer containing polyamide blocks and polyether blocks.

The copolymers containing polyamide blocks and polyether blocks result from the copolycondensation of polyamide blocks having reactive ends with polyether blocks having reactive ends, such as, inter alia:
  1) polyamide blocks having diamine chain ends with polyoxyalkylene blocks having dicarboxyl chain ends;
  2) polyamide blocks having dicarboxyl chain ends with polyoxyalkylene blocks having diamine chain ends obtained by cyanoethylation and hydrogenation of α,ω-dihydroxylated aliphatic polyoxyalkylene blocks known as polyether diols;
  3) polyamide blocks having dicarboxyl chain ends with polyether diols, the products obtained being, in this specific case, polyetheresteramides.

The polyamide blocks having dicarboxyl chain ends originate, for example, from the condensation of α,ω-aminocarboxylic acids, lactams or dicarboxylic acids and diamines in the presence of a chain-limiting dicarboxylic acid.

The polyether may be, for example, a polytetramethylene glycol (PTMG). The latter is also known as polytetrahydrofuran (PTHF).

The number-average molar mass of the polyamide blocks is between 300 and 5000 g/mol and preferably between 600 and 1500 g/mol. The molar mass of the polyether blocks is between 100 and 6000 and preferably between 200 and 3000 g/mol. The polymers having polyamide blocks and polyether blocks can also comprise randomly distributed units. These polymers can be prepared by the simultaneous reaction of the polyether and of the precursors of the polyamide blocks.

For example, polyether diol, a lactam (or an α,ω-amino acid) and a chain-limiting diacid may be reacted in the presence of a small amount of water. A polymer is obtained having essentially polyether blocks and polyamide blocks of very variable length, but also the various reactants which have reacted randomly, which are distributed randomly along the polymer chain.

The polyetherdiol blocks are either used in unmodified form and copolycondensed with carboxyl-terminated polyamide blocks, or they are aminated in order to be converted into polyetherdiamines and condensed with carboxyl-terminated polyamide blocks. They may also be blended with polyamide precursors and a chain limiter to make polymers containing polyamide blocks and polyether blocks which have randomly distributed units.

The ratio of the amount of copolymer containing polyamide blocks and polyether blocks to the amount of polyamide is advantageously between 1/99 and 15/85 by weight.

Powder

Preferably, the polyamide powder particles according to the invention have a volume median diameter (D50) of between 5 and 200 µm, more preferably between 10 and 150 µm.

Preferably, the polyamide powder according to the invention has a difference between the crystallization temperature (Tc) and the first heat melting temperature (Tm1), (Tc–Tm1), of greater than 3° C.

This difference advantageously makes it possible to avoid deformation phenomena and to obtain a good geometric definition of the manufactured parts. In addition, this difference makes it possible to increase the window for working with the polyamide powder and to make the use thereof in a sintering process much easier. Preferably, the inherent viscosity in solution of the polyamide powder according to the invention, in particular before the use thereof in a powder agglomeration process according to the invention, is less than 1.90, preferably less than 1.70, preferably less than 1.60, preferably less than 1.50.

Preferably, the inherent viscosity in solution of the polyamide powder according to the invention, in particular after a first run in a powder agglomeration process according to the invention, is greater than 1.

Preferably, the polyamide powder according to the invention, when it is molten increases in viscosity, in order to reach a sufficient molecular mass, and to ensure a viscosity in solution of the part preferably of greater than 1.50, so that the part (3D object) has acceptable mechanical properties. More preferably, the viscosity of the part is greater than 1.60, preferably greater than 1.70, preferably greater than 1.80, preferably greater than 1.90, preferably greater than 2.

Preferably, the powder according to the invention can be recycled at least 3 times, preferably at least 5 times and more preferably at least 10 times.

Additional Compounds

The polyamide according to the invention, whether or not as a blend with at least one other polymer, may contain organic or mineral fillers, pigments, antioxidants, notably combined with a thioether antioxidant, UV stabilizers, plasticizers, dyes, pourability agents.

The polymer powder according to the invention may comprise a thioether antioxidant. Advantageously, the addition of such an antioxidant to the polymer powder according to the invention makes it possible to stabilize the color of the powder, notably its whiteness when it is white, in particular by limiting the yellowing thereof during the recycling of the powder according to the invention.

The thioether antioxidant according to the invention is, preferably, selected from the group consisting of dilauryl thiodipropionate (DLTDP), ditridecyl thiodipropionate (DTDTDP), distearyl thiodipropionate (DSTDP), dimyristyl thiodipropionate (DMTDP), pentaerythrityl tetrakis(3-dodecylthiopropionate or 3-laurylthiopropionate), 3,3'-thiodipropionate, (C12-14)alkyl thiopropionate, dilauryl 3,3'-thiodipropionate, ditridecyl 3,3'-thiodipropionate, dimyristyl 3,3'-thiodipropionate, distearyl 3,3'-thiodipropionate, dioctadecyl 3,3'-thiodipropionate, lauryl stearyl 3,3-thiodipropionate, tetrakis[methylene 3-(dodecylthio)propionate]methane, thiobis(2-tert-butyl-5-methyl-4,1-phenylene)bis(3-(dodecylthio)propionate), 2,2'-thiodiethylenebis(3-aminobutenoate), 4,6-bis(octylthiomethyl)-o-cresol, 2,2'-thiodiethylenebis 3-(3,5-tert-butyl-4-hydroxyphenyl) propionate, 2,2'-thiobis(4-methyl-6-tert-butylphenol), 2,2'-thiobis(6-tert-butyl-p-cresol), 4,4'-thiobis(6-tert-butyl-3-methylphenol), 4,4'-thiobis(4-methyl-6-tert-butylphenol), bis(4,6-tert-butyl-1-yl-2-) sulfides, tridecyl-3,5-di-tert-butyl-4-hydroxybenzyl thioacetate, 1,4-bis(octylthiomethyl)-6-phenol, 2,4-bis(dodecylthiomethyl)-6-methylphenol, distearyl disulfide, bis(methyl-4-3-n-(C12/C14)alkyl thiopropionyloxy 5-tert-butylphenyl) sulfide, and mixtures thereof. More preferably, the thioether antioxidant according to the invention is selected from the group consisting of dilauryl thiodipropionate (DLTDP), ditridecyl thiodipropionate (DTDTDP), distearyl thiodipropionate (DSTDP), dimyristyl thiodipropionate (DMTDP), pentaerythrityl tetrakis(3-dodecylthiopropionate or 3-laurylthiopropionate), and mixtures thereof. More preferably, the thioether antioxidant according to the invention is DLTDP or pentaerythrityl tetrakis(3-dodecylthiopropionate).

Such antioxidants are notably sold by the companies Songnox or Adeka.

Preferably, said at least one thioether antioxidant represents at least 0.1%, preferably from 0.1% to 5%, preferably from 0.1% to 4%, preferably from 0.1% to 3%, preferably from 0.1% to 2%, preferably from 0.1% to 1% by weight, relative to the total weight of powder representing 100%.

According to the invention, the thioether antioxidant as defined above is incorporated into the powder by any suitable method known to those skilled in the art, for example by at least one of the following methods: addition of thioether during the synthesis of the polyamide, notably at the start or at the end of the synthesis, by blending by compounding, during any step of a powder manufacturing process starting from said polyamide, notably by dissolution-precipitation of polyamide in a solvent containing the thioether, for example dispersed or dissolved in the solvent, or by dry blending with the polyamide powder according to the invention.

According to one embodiment, the chain limiter is mixed with the polyamide powder, and at least one thioether antioxidant, by dry blending.

According to one embodiment, the thioether is added, with the chain limiter, to a polyamide prepolymer powder having an inherent viscosity of less than or equal to 0.80, which undergo a solid-state polycondensation step in order to obtain a polyamide powder having the desired viscosity.

According to one embodiment, the chain limiter is mixed with the polyamide prepolymer powder, and at least one thioether antioxidant, after a water treatment step and/or an acid treatment step.

The thioether according to the invention is preferably in powder form.

Preferably also, said thioether antioxidant has a melting point below 140° C., preferably below 100° C., preferably below 90° C., preferably below 70° C. As examples of antioxidants other than the thioether antioxidant used according to the invention, mention may be made of phenolic antioxidants intended for combating the thermal oxidation of the polyamides, such as 3,3'-bis(3,5-di-tert-butyl-4-hydroxyphenyl)-N,N'-hexamethylenedipropionamide notably sold under the name Palmarole AO.OH.98 by Palmarole, (4,4'-butylidenebis(2-t-butyl-5-methylphenol) notably sold under the name Lowinox 44B25 by Addivant, pentaerythrityl tetrakis(3-(3,5-di-tert-butyl-4-hydroxyphenyl)propionate) notably sold under the name Irganox® 1010 by BASF, N,N'-hexane-1,6-diylbis(3-(3,5-di-tert-butyl-4-hydroxyphenylpropionamide)) notably sold under the name Irganox® 1098 by BASF, 3,3',3',5,5',5'-hexa-tert-butyl-α,α', α'-(mesitylene-2,4,6-triyl)tri-p-cresol notably sold under the name Irganox® 1330 by BASF, ethylenebis(oxyethylene) bis(3-(5-tert-butyl-4-hydroxy-m-tolyl) propionate) notably sold under the name Irganox® 245 by BASF, 1,3,5-tris(3, 5-di-tert-butyl-4-hydroxybenzyl)-1,3,5-triazine-2,4,6(1H, 3H,5H)-trione notably sold under the name Irganox® 3114 by BASF, N'N'-(2-ethyl-2'-ethoxyphenyl)oxanilide notably sold under the name Tinuvin® 312 by BASF, 4,4',4''-trimethyl-1,3,5-benzenethyl)tris(methylene)]tris[2,6-bis(1, 1-dimethylethyl)]phenol notably sold under the name Alvinox® 1330 by 3V, Hostanox 245 FF, Hostanox 245 Pwd, sold by Clariant, pentaerythrityl tetrakis(3-(3,5-di-tert-butyl-4-hydroxyphenyl)propionate) notably sold under the names Evernox 10 and Evernox 10GF by Everspring Chemical Company Limited, octadecyl 3-(3,5-di-tert-4-hydroxyphenyl)propionate notably sold under the names Evernox 76 and Evernox 76GF by Everspring Chemical Company Limited, tetrakis[methylene-3-(3',5'-di-tert-butyl-4- hydroxyphenyl)propionate]methane notably sold under the name BNX® 1010 by Mayzo, thiodiethylene bis[3-(3,5-di-tert-butyl-4-hydroxyphenyl) propionate] notably sold under the name BNX® 1035 by Mayzo, tetrakis[methylene-3-(3', 5'-di-tert-butyl-4-hydroxyphenyl)propionate]methane, octadecyl 3-(3,5-di-tert-butyl-4-hydroxyphenyl)propionate notably sold under the name BNX® 2086 by Mayzo, 1,3,5-tris(3,5-di-tert-butyl-4-hydroxybenzyl)-1,3,5-triazine-2,4,6(1H,3H,5H)trione notably sold under the name BNX® 3114 by Mayzo.

Process for Agglomeration by Melting

As understood here, a process for agglomeration of powder by melting is considered synonymous with sintering.

The process for agglomeration of powder by melting according to the invention is preferably a process for manufacturing objects or articles, in particular three-dimensional (3D) objects or articles.

The melting is preferably obtained using radiation or an input of electromagnetic energy. The radiation can be chosen from any radiation well known to those skilled in the art. As examples of radiation, mention may be made of a laser beam, infrared radiation, UV radiation, LED-type radiation. Particularly preferably, the melting is obtained by laser radiation, reference is then made to a "laser sintering" process.

More preferably still, the process for agglomeration of powder by melting according to the invention is a "selective laser sintering" process or a process known as "High Speed Sintering" (HSS) or "Multi-Jet Fusion" (MJF).

Preferably, the process for agglomeration of powder by melting according to the invention is a layer-by-layer process or an additive manufacturing process.

By way of example, the process for agglomeration of powder by melting according to the invention comprises the following steps:
  a. a thin layer of polyamide powder according to the invention (layer 1) is deposited on a horizontal plate maintained in a chamber heated to a temperature lying between the crystallization temperature (Tc) and the melting temperature (Tm) of said powder,
  b. radiation, notably laser radiation, enables the agglomeration of the powder particles by melting at various points in the powder layer (layer 1) according to a geometry corresponding to the object to be manufactured,
  c. the horizontal plate is then lowered by a value corresponding to the thickness of one powder layer and then a new powder layer is deposited (layer 2),
  d. the radiation, notably laser radiation, enables the agglomeration of the particles by melting of the powder layer (layer 2) according to a geometry corresponding to this new slice of the object to be manufactured,
  e. the previous steps are repeated, thus forming a cycle, until the object is built;
  f. an object surrounded by powder is obtained inside the chamber;
  g. after complete cooling, the object is separated from the powder.

Particularly preferably, the process for agglomeration of powder by melting according to the invention is a 3D printing process.

The process for agglomeration of powder by melting according to the invention can be carried out by a suitable device, in particular a 3D printer. As examples of devices, mention may be made of the sintering devices sold by EOS, 3D Systems, Aspect, Trump Precision Machinery, Hewlett Packard, Sinterit, Sintratec, Sharebot, FormLabs, Sonda Sys, Farsoon, Prodways, Ricoh, Wematter3D, VoxelJet, or else Xaar.

Mention may more particularly be made of the EOSINT P396 and Formiga P100 devices from EOS GmbH.

The powder reused or recycled according to the invention is the powder which has not been agglomerated, or which has not melted, during the various powder melting cycles needed to manufacture or build an object. As is understood here, the various cycles form a "run". In other words, a "run" corresponds to a build.

Preferably, in each set of build cycles, or "run", the content of recycled powder is at least 50%, preferably at least 60%, more preferably at least 70% by weight, relative to the total weight of powder used in the machine on each run. Preferably also, starting from a first run which uses 100% of fresh, i.e. non-recycled, powder, each following run reuses or recycles at least 50%, preferably at least 60%, preferably at least 70%, by weight of powder from the preceding run which has not been agglomerated, relative to the total weight of powder used in the machine on each run.

Object

The object or article according to the invention is preferably a three-dimensional (3D) object or article, in particular a 3D printing product.

Preferably, this object is chosen from a prototype, a part model ("rapid prototyping"), a small-series finished part ("rapid manufacturing") for motor vehicle, nautical, aeronautical, aerospace, medical (prostheses, hearing systems, and the like), textile, clothing, fashion and decoration fields, the field of housings for electronics, telephony, home automation, computing, lighting, sport, and industrial tools.

Preferably, the objects according to the invention have:
  a modulus of greater than 1500 MPa,
  an elongation at break of greater than 40%, and
  a tensile strength of greater than 40 MPa, preferably 45 MPa, even after several recyclings of the powder, for objects built in X/Y, that is to say manufactured mainly in two horizontal dimensions or "flat" in the device for agglomeration of powder by melting. The above mechanical properties (modulus, elongation at break, tensile strength) are preferably all measured according to standard ISO 527-1B: 2012.

The invention will be further explained in a nonlimiting manner with the aid of the following example.

EXAMPLE

Example 1

The inventors studied the aging of the powder according to the invention by reproducing the conditions to which the powders for 3D printing are exposed during several print runs.

A. Materials and Methods

1. Materials Used 1.1. Polyamide Powder According to the Invention

The 3D printing powder tested consists of 1000 parts by weight of a PA11 powder obtained by milling the polymer resulting from the polycondensation of 11-aminoundecanoic acid catalyzed by hypophosphoric acid ($H_3PO_4$) (powder 1)

or by hypophosphorous acid (H$_3$PO$_2$) (powder 2) and mixed with 2 to 5 parts by weight of a phenolic antioxidant (Irganox 245 (BASF)), 3 to 8 parts by weight of a thioether antioxidant (ADK Stab AO412S (Adeka)), 1 to 3 parts by weight of a flow agent (Cab-O-Sil TS 610 (CABOT)). Three samples were formulated comprising 2, 4 and 6 parts by weight of sebacic acid (DC10). The sebacic acid, antioxidants and flow agent were added to the PA11 prepolymer, then the mixture was subjected to a solid-state polycondensation step in order to give the polyamide powder of example 1.1.

1.2. Comparative Example

The comparative example consists of 1000 parts by weight of a PA11 powder obtained by milling the polymer resulting from the polycondensation of 11-aminoundecanoic acid catalyzed by hypophosphoric acid (H$_3$PO$_4$) (powder 1) or by hypophosphorous acid (H$_3$PO$_2$) (powder 2) and mixed with 3 parts by weight of a phenolic antioxidant (Irganox 245 (BASF)), 5 parts by weight of a thioether antioxidant (ADK Stab AO412S (Adeka)), 2 parts by weight of a flow agent (Cab-O-Sil TS 610 (CABOT)). The antioxidants and flow agent were added to the PA11 prepolymer, then the mixture is subjected to a solid-state polycondensation step, in order to give the powder of example 1.2.

2. Aging

The test consists in exposing the polyamide powder to a temperature of 10 to 50° C. below the melting temperature Tm of the pure polyamide. The polyamide powders (comparative example and polyamide powders according to the invention) are placed in glass bottles sealed by an aluminum cap perforated with holes. The bottles are placed in an oven (ITEM FGE 140) regulated at 180° C., under air, for aging. This test simulates the exposure conditions to which a powder may be subjected in a 3D machine, for 1 run or several runs, according to the exposure times. The exposure times range from 0 to 90 h.

3. Inherent Viscosity of the Polyamide Powder

The inherent viscosity is measured at 20° C., in solution at 0.5% by weight in meta-cresol according to the method for measuring the viscosity described in detail above.

4. Melting Temperature of the Polyamide Powder

The melting temperature of the powder is measured by differential scanning calorimetry (DSC) according to the ISO 11357-6 standard on a DSC Q2000 device (TA Instruments), with an equilibrium at −20° C. (temperature change rate 20° C./min up to 240° C., 20° C./min down to −20° C., 20° C./min up to 240° C.).

B. Results

Table 1 below includes the viscosity measurements of polyamide powders (comparative example and polyamide powders according to the invention) having an initial viscosity of 1.35.

TABLE 1

| Time | Comparative example 0 part sebacic acid | Example 1 2 parts sebacic acid | Example 2 4 parts sebacic acid | Example 3 6 parts sebacic acid |
| --- | --- | --- | --- | --- |
| T0 | 1.35 | 1.35 | 1.35 | 1.35 |
| 30 hours | 1.84 | 1.41 | 1.22 | 1.09 |
| 72 hours | 1.81 | 1.43 | 1.23 | 1.16 |
| 90 hours | 1.83 | 1.37 | 1.22 | 1.10 |

Table 2 below represents the viscosity measurements of polyamide powders according to the invention having an initial viscosity of 1.10.

TABLE 2

| Time | Example 4 2 parts sebacic acid | Example 5 4 parts sebacic acid | Example 6 6 parts sebacic acid |
| --- | --- | --- | --- |
| T0 | 1.10 | 1.10 | 1.10 |
| 30 hours | 1.33 | 1.18 | 1.06 |
| 72 hours | 1.32 | 1.15 | 1.06 |
| 90 hours | 1.31 | 1.15 | 1.05 |

Table 3 below includes the melting temperature measurements of the polyamide powders according to the invention above having an initial viscosity of 1.10.

TABLE 3

| Time | Example 4 2 parts sebacic acid | Example 5 4 parts sebacic acid | Example 6 6 parts sebacic acid |
| --- | --- | --- | --- |
| T0 | 201.2 | 200.5 | 200.4 |
| 30 hours | 203.2 | 201.6 | 200.8 |
| 72 hours | 202.7 | 201.9 | 201.5 |
| 90 hours | 202.4 | 202.1 | 201.6 |

C. Conclusion

The presence of a chain-limiting dicarboxylic acid, sebacic acid, makes it possible to control the increase in viscosity and melting temperature of a polyamide powder that occurs during aging representative of the successive 3D printing runs (cycles).

Example 2

The samples were prepared according to the protocol described in example 1 (see 1.1).

The aging tests were carried out according to the protocol described in example 1 (see 1.2) except that the tests were carried out at 180° C. under vacuum.

| Aging time (hours) | 0 part sebacic acid | 2 parts sebacic acid | 4 parts sebacic acid | 6 parts sebacic acid |
| --- | --- | --- | --- | --- |
| 0 | 1.21 | 1.26 | 1.19 | 1.16 |
| 4 h | 2 | 1.7 | 1.4 | 1.31 |
| 8 h | 2.85 | 1.9 | 1.55 | 1.44 |
| 16 h | N.D. | 2.52 | 1.64 | 1.56 |
| 24 h | N.D. | N.D. | 2.1 | 1.67 |

N.D. = not done.

It was observed that the presence of sebacic acid makes it possible to reduce the increase in viscosity of a polyamide powder that occurs during aging under vacuum representative of the successive 3D printing runs (cycles).

Example 3

The 3D printing powder tested consists of 1000 parts by weight of a PA11 powder, dry blended with 2 to 5 parts by weight of a phenolic antioxidant (Irganox 245 (BASF)), 3 to 8 parts by weight of a thioether antioxidant (ADK Stab AO412S (Adeka)), 1 to 3 parts by weight of a flow agent (Cab-O-Sil TS 610 (CABOT)). Three samples were formulated comprising 2, 4 and 6 parts by weight of sebacic acid (DC10), and 6 parts by weight of dodecanedioic acid (DC12).

The aging tests were carried out according to the protocol described in example 1 (see 1.1) at 180° C. under vacuum.

| Aging time under vacuum at 180° C. (h) | 0 part DC10 | 2 parts DC10 | 4 parts DC10 | 6 parts DC10 | 8 parts DC10 | 6 parts DC12 |
|---|---|---|---|---|---|---|
| 0 | 1.16 | 1.16 | 1.16 | 1.16 | 1.16 | 1.16 |
| 4 | 1.79 | 1.67 | 1.47 | 1.36 | 1.25 | 1.6 |
| 8 | 2.78 | 2.28 | 1.72 | 1.38 | 1.17 | 1.77 |
| 16 | N.D. | 1.98 | 1.56 | 1.42 | 1.34 | 1.98 |
| 24 | N.D. | N.D. | N.D. | 1.62 | 1.4 | N.D. |

N.D. = not done.

It was observed that the presence of sebacic acid or of dodecanedioic acid makes it possible to reduce the increase in viscosity of a polyamide powder that occurs during aging under vacuum representative of the successive 3D printing runs (cycles).

The invention claimed is:

1. A powder composition intended to be used in a process for agglomeration of powder by melting, the powder composition comprising a polyamide and at least one chain limiter,
   wherein the chain limiter comprises sebacic acid, and
   wherein the composition further comprises at least one thioether antioxidant.

2. The powder composition as claimed in claim 1, wherein the chain limiter represents from 0.01% to 10% by weight relative to the total weight of powder composition representing 100%.

3. The powder composition as claimed in claim 1, wherein the chain limiter further comprises a second chain limiter selected from the group consisting of acetic acid, propionic acid, benzoic acid, stearic acid, lauric acid, butanoic acid, pentanoic acid, hexanoic acid, heptanoic acid, octanoic acid, nonanoic acid, decanoic acid, undecanoic acid, acrylic acid, methacrylic acid, crotonic acid, cinnamic acid, hexadecanoic acid, octodecanoic acid, tetradecanoic acid, adipic acid, azelaic acid, suberic acid, dodecanedicarboxylic acid, ortho-phthalic acid, butanedioic acid, 1-aminopentane, 1-aminohexane, 1-aminoheptane, 1-aminooctane, 1-aminononane, 1-aminodecane, 1-aminoundecane, 1-aminododecane, benzylamine, oleylamine, bis(4-aminocyclohexyl) methane (BACM), bis(3-methyl-4-aminocyclohexyl) methane (BMACM), and 2,2-bis(3-methyl-4-aminocyclohexyl) propane (BMACP), para-aminodicyclohexylmethane (PACM), isophoronediamine (IPDA), 2,6-bis(aminomethyl) norbornane (BAMN), and piperazine.

4. The powder composition as claimed in claim 1, wherein the polyamide comprises at least one monomer selected from the group consisting of 46, 4T, 54, 59, 510, 512, 513, 514, 516, 518, 536, 6, 64, 69, 610, 612, 613, 614, 616, 618, 636, 6T, 9, 104, 109, 1010, 1011, 1012, 1013, 1014, 1016, 1018, 1036, 10T, 11, 12, 124, 129, 1210, 1212, 1213, 1214, 1216, 1218, 1236, 12T, MXD6, MXD10, MXD12, and MXD14.

5. The powder composition as claimed in claim 1, wherein the polyamide is selected from the group consisting of PA 6, PA 66, PA 1010, PA 11, PA 12, PA 1011, PA 610, PA 612, PA 613, and mixtures thereof.

6. The powder composition as claimed in claim 1, wherein said at least one thioether antioxidant is selected from the group consisting of dilauryl thiodipropionate (DLTDP), ditridecyl thiodipropionate (DTDTDP), distearyl thiodipropionate (DSTDP), dimyristyl thiodipropionate (DMTDP), and pentaerythrityl tetrakis(3-laurylthiopropionate).

7. The powder composition as claimed in claim 1, wherein said at least one thioether antioxidant represents from 0.1% to 5% by weight relative to the total weight of powder representing 100%.

8. A process for preparing the powder composition as claimed in claim 1, wherein the chain limiter is mixed with the polyamide powder by dry blending.

9. A powder composition obtained from the process of claim 8.

10. A process for preparing the powder composition as claimed in claim 1, wherein the polyamide is a polyamide prepolymer, wherein the chain limiter is mixed with a powder of the polyamide prepolymer having an inherent viscosity of less than or equal to 0.80, comprising a step of solid-state polycondensation of said mixture.

11. The process as claimed in claim 10, wherein the chain limiter is mixed with the polyamide prepolymer powder, after a water treatment step and/or an acid treatment step.

12. A process for manufacturing an object wherein the powder composition of claim 1 is agglomerated by melting.

13. An object manufactured using the powder composition as defined in claim 1.

14. The powder composition as claimed in claim 1, wherein the chain limiter has been added to an already formed polyamide, wherein the chain limiter is not added to a reaction mixture comprising monomers of the polyamide.

15. The powder composition as claimed in claim 1, wherein the chain limiter and the polyamide powder have been mixed by dry blending.

16. The powder composition as claimed in claim 15, wherein the chain limiter, the polyamide powder, and the thioether antioxidant have been mixed by dry blending.

17. The powder composition as claimed in claim 15, wherein the polyamide is in the form of polyamide powder particles, wherein the polyamide powder particles have a volume median diameter (D50) of between 5 and 200 μm.

18. The powder composition as claimed in claim 1, wherein the polyamide has a difference between a crystallization temperature ($T_c$) and a first heat melting temperature ($T_{m1}$), ($T_c$-$T_{m1}$), of greater than 3° C.

19. The powder composition as claimed in claim 1, wherein the powder composition has an inherent viscosity in solution, before use thereof in a powder agglomeration process, of less than 1.90, and wherein the powder composition has an inherent viscosity in solution, after a first run in the process for agglomeration of powder by melting, of greater than 1.

* * * * *